US012710115B2

(12) United States Patent
Lee

(10) Patent No.: US 12,710,115 B2
(45) Date of Patent: Aug. 18, 2026

(54) FIRE-RESISTANT FILLER

(71) Applicants: KUK IL INNTOT CO., LTD., Ulsan (KR); Jong Chul Lee, Ulsan (KR)

(72) Inventor: Jong Chul Lee, Seoul (KR)

(73) Assignees: KUK IL INNTOT CO., LTD., Ulsan (KR); Jong Chul Lee, Ulsan (KR)

( * ) Notice: Subject to any disclaimer, the term of this patent is extended or adjusted under 35 U.S.C. 154(b) by 232 days.

(21) Appl. No.: 18/571,639

(22) PCT Filed: Jun. 17, 2022

(86) PCT No.: PCT/KR2022/008657

§ 371 (c)(1),
(2) Date: Dec. 18, 2023

(87) PCT Pub. No.: WO2022/265462

PCT Pub. Date: Dec. 22, 2022

(65) Prior Publication Data

US 2024/0288097 A1 Aug. 29, 2024

(30) Foreign Application Priority Data

Jun. 18, 2021 (KR) ........................ 10-2021-0079298
Jun. 17, 2022 (KR) ........................ 10-2022-0074276

(51) Int. Cl.
*F16L 5/04* (2006.01)
*A62C 2/06* (2006.01)

(52) U.S. Cl.
CPC ................ *F16L 5/04* (2013.01); *A62C 2/065* (2013.01)

(58) Field of Classification Search
CPC ............... A62C 2/065; A62C 3/16; F16L 5/04
See application file for complete search history.

(56) References Cited

U.S. PATENT DOCUMENTS 5,634,304 A * 6/1997 Sakno ........................ F16L 5/04 138/119
5,957,211 A * 9/1999 Geuken .................. A62C 2/065 169/48
2011/0011601 A1* 1/2011 Ono ........................ B32B 5/024 169/48
2016/0339278 A1* 11/2016 King, Jr. ................. F24F 13/08
2017/0030609 A1* 2/2017 Kjetil ..................... C09D 5/185

FOREIGN PATENT DOCUMENTS

| | | | |
|---|---|---|---|
| CN | 111550669 | A | 8/2020 |
| JP | 2000-144972 | A | 5/2000 |
| JP | 2007-054617 | A | 3/2007 |
| JP | 5528631 | B2 | 6/2014 |
| JP | 2015-194229 | A | 11/2015 |
| JP | 2020-033803 | A | 3/2020 |
| KR | 10-1670171 | B1 | 10/2016 |
| KR | 10-2017-0018527 | A | 2/2017 |
| KR | 10-2244052 | B1 | 4/2021 |
| KR | 10-2347166 | B1 | 1/2022 |

* cited by examiner

*Primary Examiner* — Cody J Lieuwen
(74) *Attorney, Agent, or Firm* — Bridgeway IP Law Group, PLLC; Hyun Woo Shin

(57) ABSTRACT

Provided is a fire-resistant filler which is formed inside a pipe to divide the space inside the pipe, and has, on the surface thereof, a coating layer including expandable graphite. As the coating layer expands by flame or heat, the filler blocks the pipe by filling the space inside the pipe. Thus, the filler can prevent the spread of the fire by quickly responding to the fire.

8 Claims, 14 Drawing Sheets

FIRE-RESISTANT FILLER

TECHNICAL FIELD

The present invention relates to an apparatus installed on a pipe or the like to prevent the spread of a fire.

BACKGROUND ART

In case of fire in an actual building, as a measure for localizing or minimizing damage by preventing smoke and flame from rapidly spreading to upper floors or adjacent rooms, it is very important to block through portions in building construction. In particular, since pipes are originally used as passages through which a fluid flows, flames and toxic gases may spread quickly through the pipes in case of fire.

In order to prevent this, a fireproof filler can be provided inside the pipes and the like. The fireproof filler can prevent the spread of the fire by being expanded by flame and heat to block the pipes.

RELATED ART DOCUMENTS

Patent Documents (Patent Document 1) Korean Patent Registration No. 10-2347166 (registered on Dec. 30, 2021)

(Patent Document 2) Korean Patent Registration No. 10-2244052 (registered on Apr. 19, 2021)

DISCLOSURE

Technical Problem

The present invention is directed to providing a fireproof filler capable of quickly preventing the spread of a fire.

Technical Solution

In order to achieve the object, the present invention discloses a fireproof filler formed inside a pipe to divide a space inside the pipe and formed with a coating layer having a surface including expandable graphite.

Advantageous Effects

According to the present invention, it is possible to quickly prevent the spread of a fire as compared to the related art.

BEST MODE OF THE INVENTION

The present invention provides a fireproof filler that is installed inside a pipe and fills a space inside the pipe in case of fire to block flame or heat, which includes an external frame installed inside the pipe, and at least one support formed inside the external frame and configured to divide a space inside the external frame, wherein a coating layer including expandable graphite is formed on surfaces of the external frame and the support.

Modes of the Invention

Terms used in the specification will be briefly described, and one embodiment of the present invention will be described in detail. The terms used in the specification are general terms that are currently widely used as much as possible while considering a function in the present invention, but this may be changed depending on the intention or cases of a technician who works in the art, the emergence of a new technology, or the like. In addition, in specific cases, there are terms arbitrarily selected by the applicant, and in this case, the meaning will be described in detail in the description of the corresponding invention. Therefore, the terms used in the specification should be defined based on the meanings of the terms and the overall content of the present invention rather than simply the names of the terms.

Hereinafter, embodiments according to the present invention will be described in detail with reference to the accompanying drawings.

Figure 1:
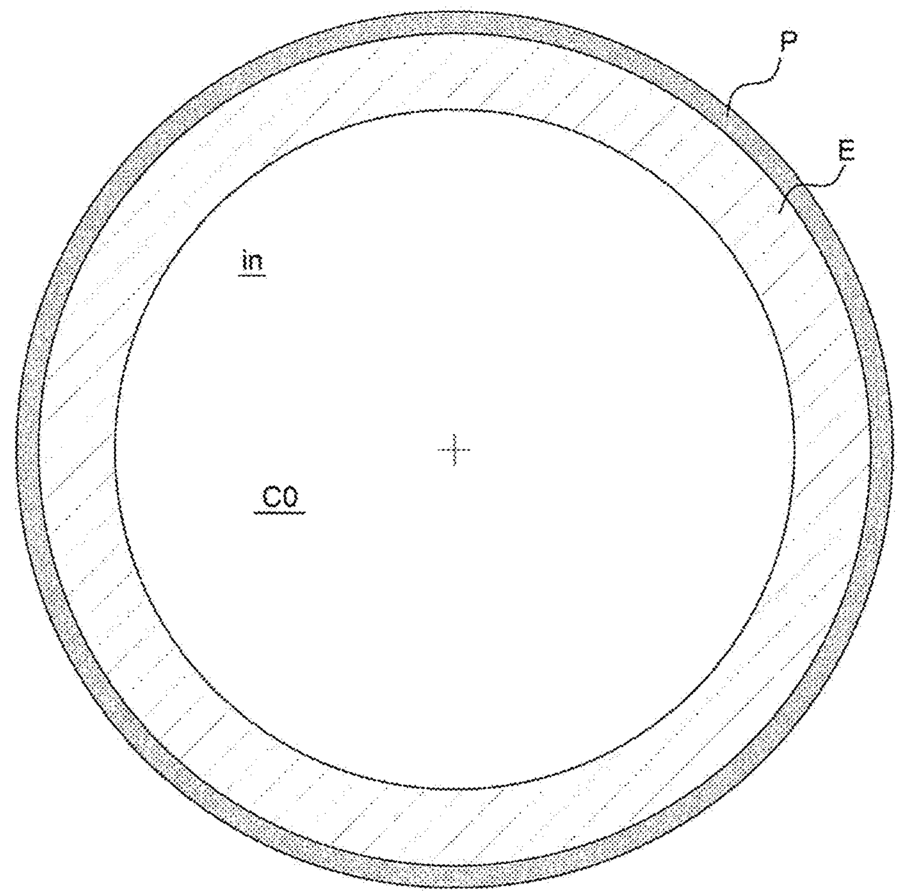
FIG. 1 is a cross-sectional view illustrating a structure of a pipe according to the related art.

FIG. 1 is a cross-sectional view illustrating a structure of a pipe according to the related art.

According to the related art, a sheet E made of an expandable graphite material is attached to an inner circumferential surface of a pipe in order to prevent the spread of a fire through a pipe P.

Figure 2:
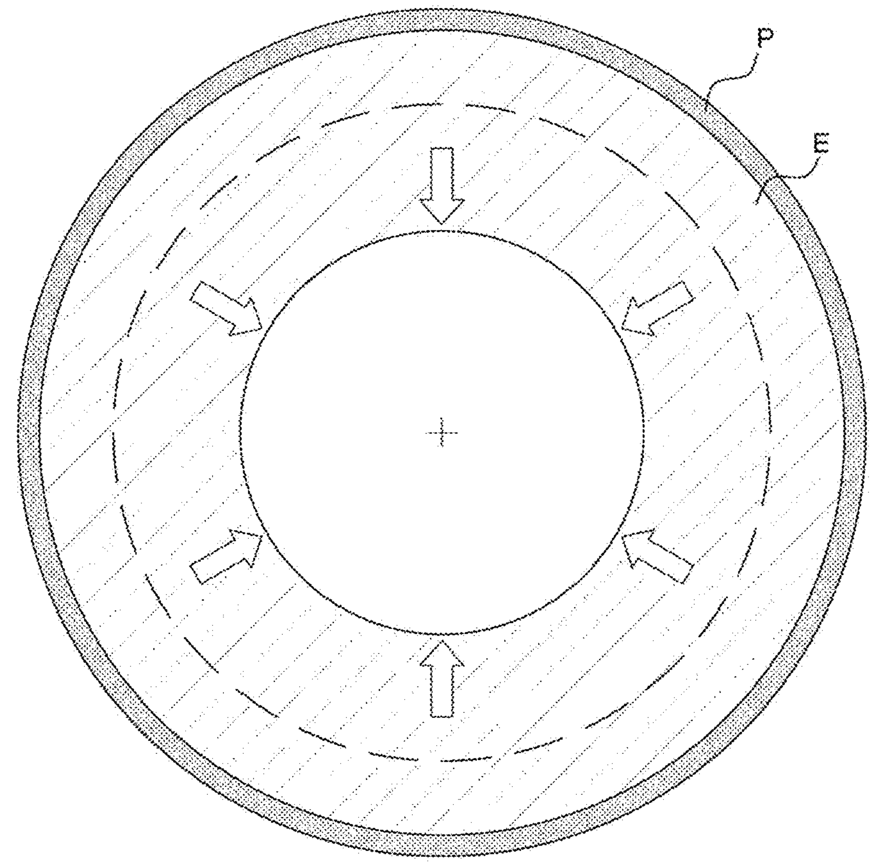
FIG. 2 is a cross-sectional view illustrating that an expansion sheet is expanded inside the pipe according to the related art.

FIG. 2 is a cross-sectional view illustrating that an expansion sheet is expanded inside the pipe according to the related art. The expandable sheet E may be expanded by flame and heat generated in case of fire and expanded from an inner circumferential surface of the pipe P toward a central axis to block the inside of the pipe P and prevent the spread of the fire.

However, in the related art, since a pipe should have a sufficient space in a central portion C0 in order to perform an original function to allow a fluid to pass therethrough, a thickness of the expandable sheet E may be formed not to have a predetermined thickness or more. Therefore, as the expandable sheet has a large width to expand from an initial thickness to fully fill the inside of the central portion C0 of the pipe in case of fire, there is a problem in that a time required for blocking is long.

In addition, there is a problem in that the expandable sheet may be detached by being separated from the inner circumferential surface of the pipe.

In order to solve the above problems of the related art, the present invention discloses a fireproof filler.

The fireproof filler according to the present invention is installed inside a pipe and expanded by flame or heat to block the inside of the pipe and prevent the spread of a fire.

Hereinafter, the present invention will be described in detail with reference to FIGS. 3 to 6.

Figure 3:
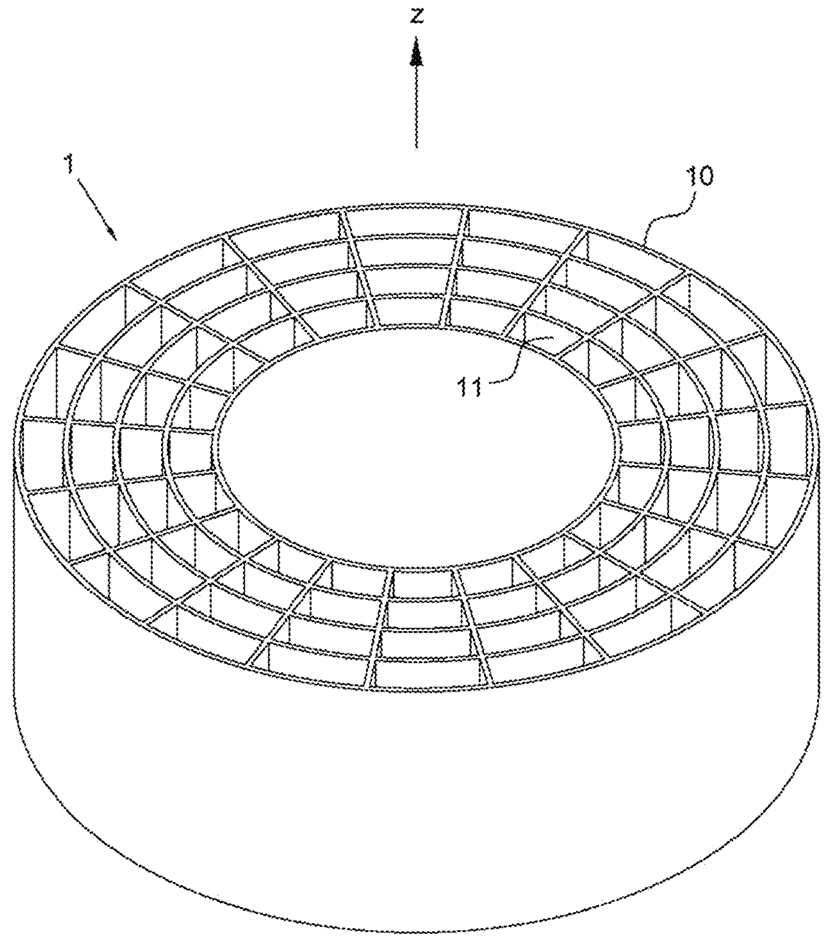
FIG. 3 is a perspective view illustrating a fireproof filler according to a first embodiment of the present invention.
Figure 4:
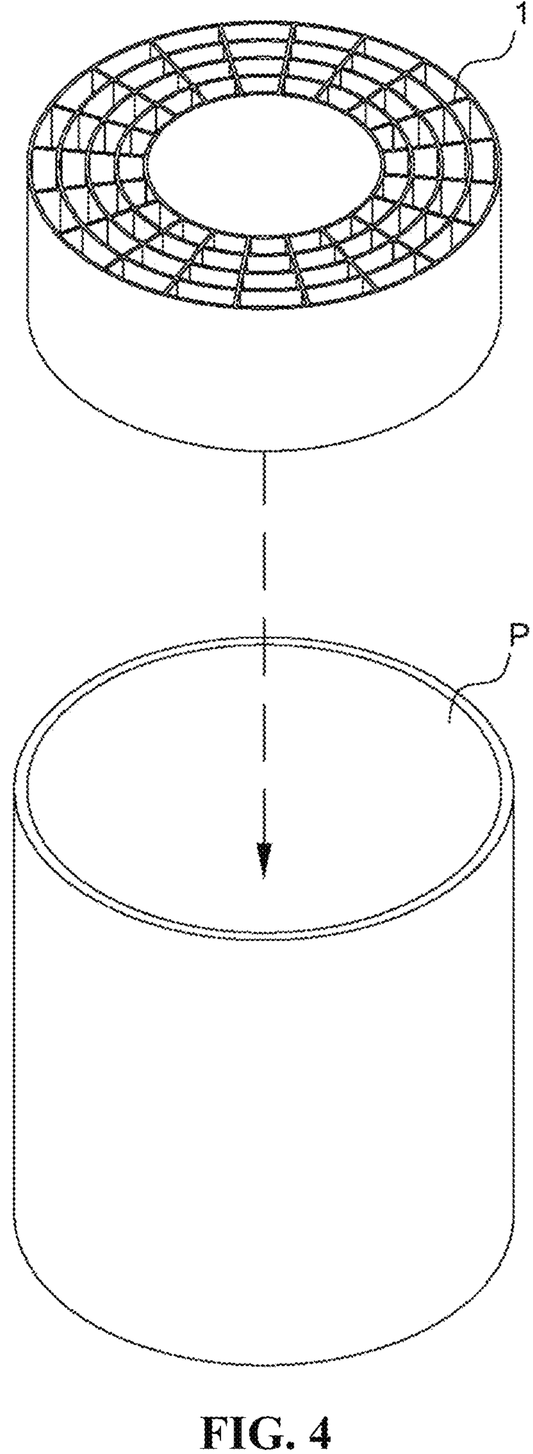
FIG. 4 is a perspective view illustrating that the fireproof filler according to the first embodiment of the present invention is inserted into a pipe.

FIGS. 3 and 4 are perspective views illustrating a fireproof filler 1 according to a first embodiment of the present invention. The fireproof filler 1 according to the present invention includes an external frame 10 and a support 11.

The external frame 10 is a component for fixing the support 11 inside a pipe P. Specifically, the external frame 10 is inserted into the pipe P and provided in a shape of a pipe with a predetermined length in which a fluid may flow through a central portion thereof. Preferably, the external frame 10 has an outer circumferential surface corresponding to an internal cross-sectional shape of the pipe P and is provided in the shape of the pipe of which a hollow central portion allows a fluid to flow. The external frame 10 is inserted into the pipe P and fixed to the inner circumferential surface of the pipe through a fixing unit such as a screw or silicone.

The cross-sectional shape of the external frame 10 is not limited to a specific shape as long as it has a size that may be inserted into the pipe P. For example, the cross-sectional shape of the external frame 10 may be a circular, quadrangular, or hexagonal shape. However, the following description will be made based on an embodiment in which the cross-sectional shape of the external frame 10 is a circular shape. When the external frame 10 has a circular cross-section, it is preferable that an outer diameter of the external frame 10 is formed to correspond to an inner diameter of a pipe to be installed.

The external frame 10 is a basic component of the fireproof filler according to the present invention, and detailed description thereof will be omitted in other embodiments below.

The support 11 is a component for partitioning and dividing the inside of the pipe P. Specifically, the support 11 is formed in the form of a partition wall inside the external frame 10 to divide a through portion of the external frame 10. However, the support 11 is formed in a shape of a wall parallel to a fluid flow direction (z direction in FIG. 3) in order to allow the fluid to flow through the pipe.

In addition, the fireproof filler 1 according to the present invention is characterized in that a coating layer including expandable graphite is formed on a surface thereof. The coating layer may be attached directly to the surface of the fireproof filler 1 in the form of a coating layer or sheet. Preferably, the coating layer may be formed by performing coating on the inner circumferential surface of the external frame 10 and both surfaces of the support 11.

Figure 5:
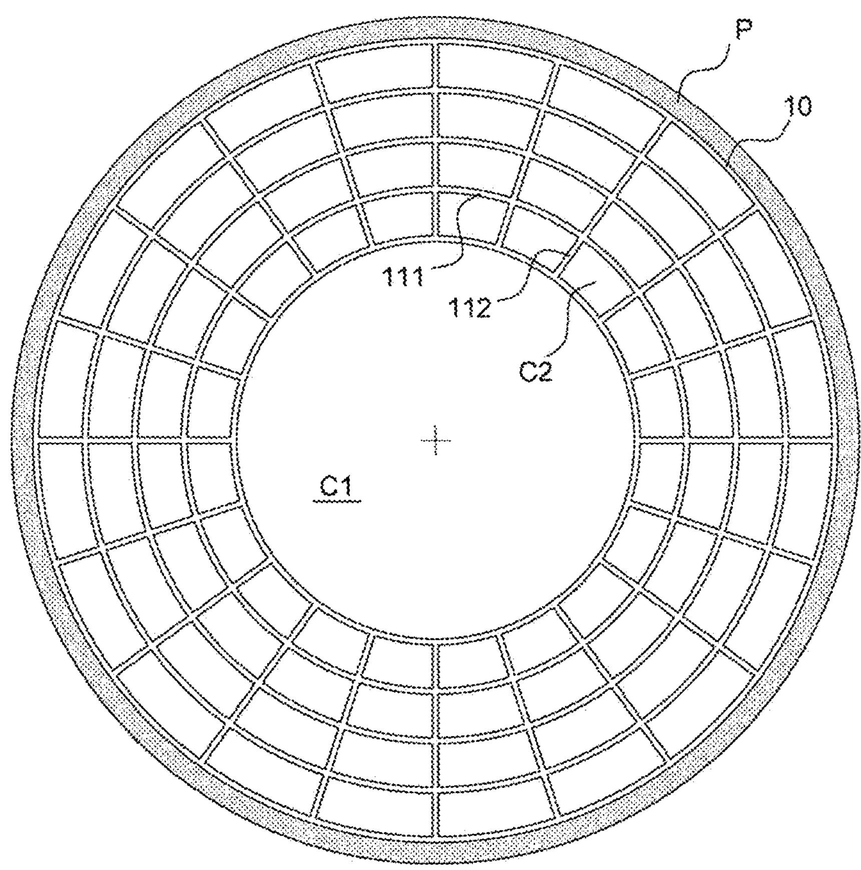
FIG. 5 is a cross-sectional view illustrating a structure of a pipe in which the fireproof filler according to the first embodiment of the present invention is installed.

According to the first embodiment of the present invention, the support 11 includes a first support 111 and a second support 112. FIGS. 3 to 5 are illustrated based on the first embodiment of the present invention.

FIG. 5 is a cross-sectional view illustrating a structure of a pipe in which the fireproof filler 1 according to the first embodiment of the present invention is installed.

A plurality of first supports 111 are provided in the form of a plurality of partition walls disposed at predetermined intervals toward the central axis from the inner circumferential surface of the external frame 10. As illustrated in FIG. 4, when installed in the pipe having the circular cross-section, the first support 111 is provided in the form of partition walls forming concentric circles.

The second support 112 is a component for fixing the first support 111 to the external frame 10 and is provided in the form of partition walls disposed vertically along the inner circumferential surface of the external frame 10.

Internal spaces of the external frame 10 and the pipe P are divided into a first compartment C1 and a second compartment C2 by the first support 111 and the second support 112.

Figure 6:
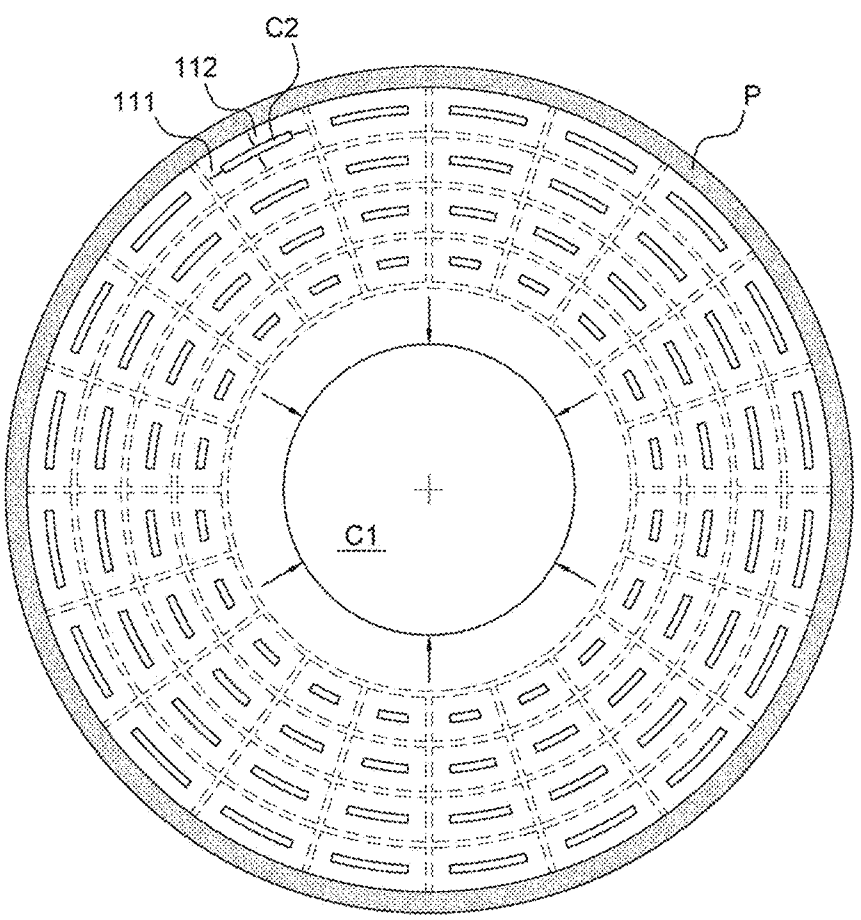
FIG. 6 is a cross-sectional view illustrating an expanding operation of the fireproof filler according to the first embodiment of the present invention.

FIG. 6 is a cross-sectional view illustrating an expanding operation of the fireproof filler 1 according to the first embodiment of the present invention. Surfaces of the external frame 10, the first support 111, and the second support 112 are coated with expandable graphite, and the expandable graphite is expanded by flame and heat generated in case of fire and expanded from the surface of each support to reduce and block the first compartment C1 and the second compartment C2.

According to the present invention, an area coated with the expandable graphite inside the pipe is increased compared to the related art. Therefore, it is possible to more quickly perform a fire spread prevention function even when coating is performed with expandable graphite to make a smaller thickness than that of the related art.

Figure 7:
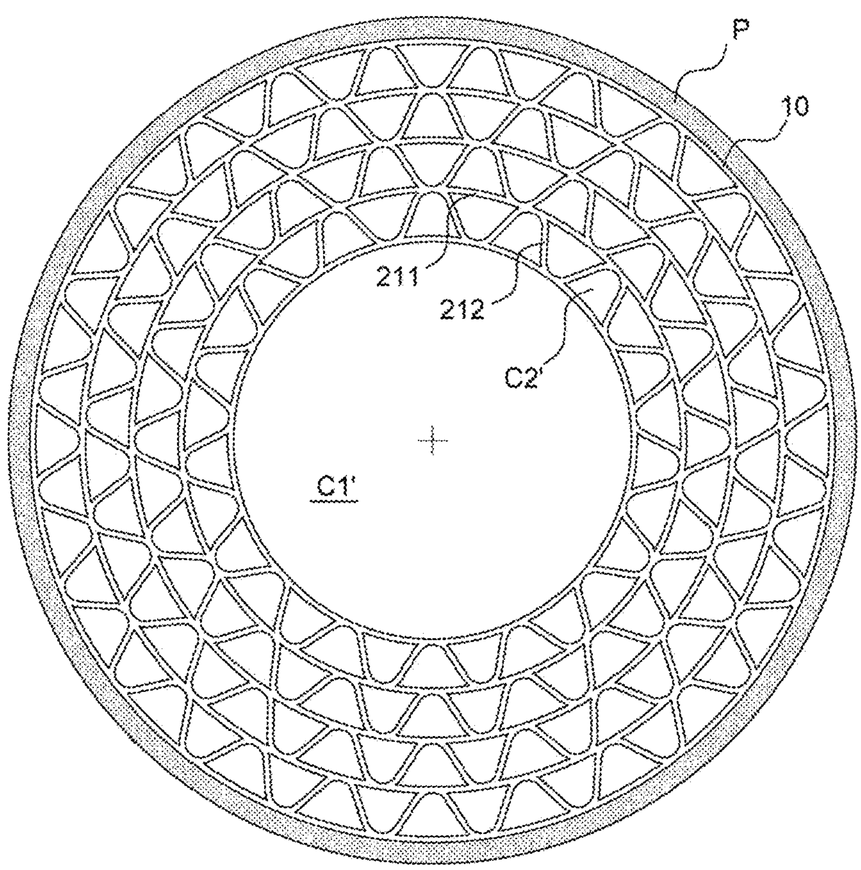
FIG. 7 is a cross-sectional view illustrating a structure of a pipe in which a fireproof filler according to a second embodiment of the present invention is installed.
Figure 8:
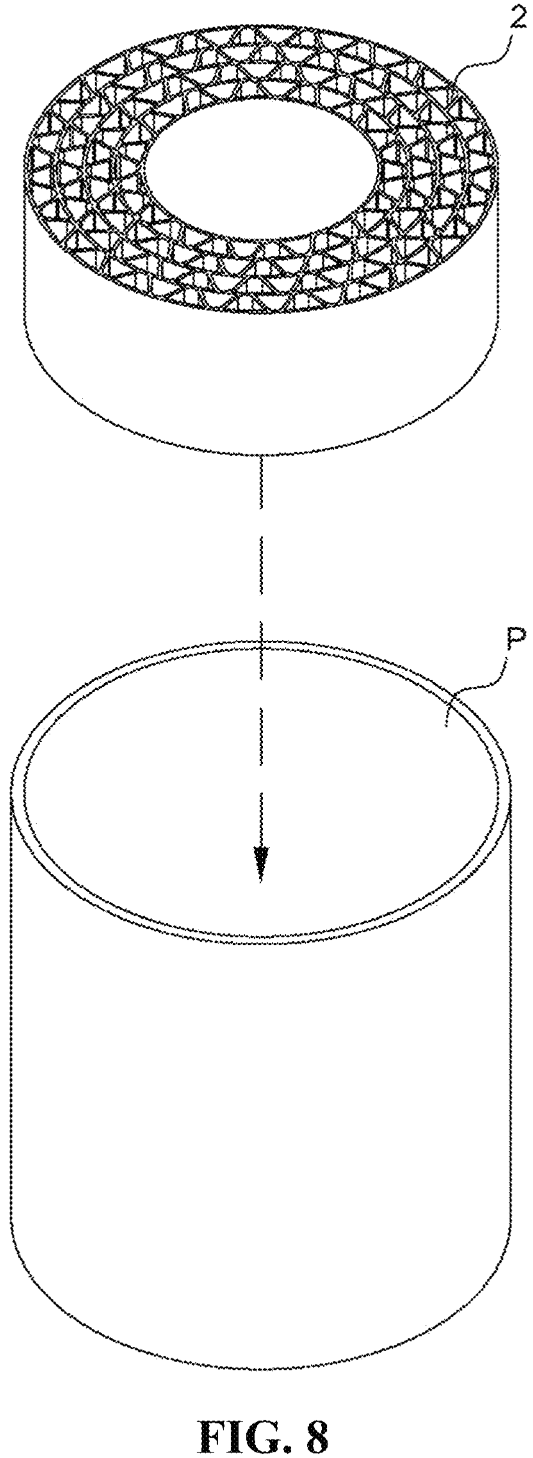
FIG. 8 is a perspective view illustrating the fireproof filler according to the second embodiment of the present invention.

FIG. 7 is a cross-sectional view illustrating a structure of a pipe in which a fireproof filler 2 according to a second embodiment of the present invention is installed, and FIG. 8 is a perspective view illustrating the fireproof filler 2 according to the second embodiment of the present invention.

According to the second embodiment of the present invention, the fireproof filler 2 may be provided to have a corrugated cross section.

Specifically, a plurality of first supports 211 are provided in the form of partition walls disposed at predetermined intervals toward the central axis from the inner circumferential surface of the external frame 10 as in the first embodiment. As illustrated in FIG. 6, when installed in the pipe having the circular cross-section, the first support 211 is provided in the form of partition walls forming concentric circles.

The second support 212 is a component for supporting the first support 211, has a horizontal cross-section in a corrugated shape with repeating peaks and valleys, is disposed between the first supports 211, and provided so that the peaks and the valleys are each provided to come into contact with the first support 211.

The inside of the pipe P is divided into a first compartment C1' and a second compartment C2' by the first support 111 and the second support 112.

Figure 9:
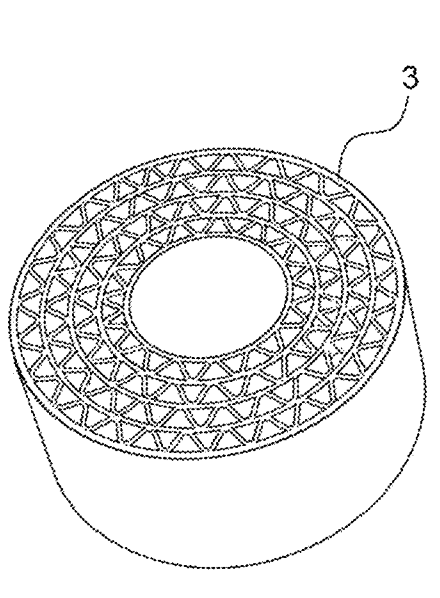
FIG. 9 is a view illustrating a fireproof filler according to a third embodiment of the present invention.
Figure 9:
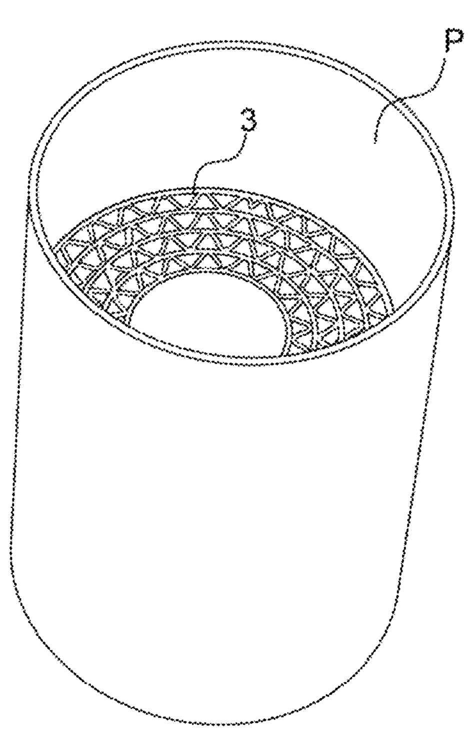

FIG. 9 is a view illustrating a fireproof filler 3 according to a third embodiment of the present invention.

Figure 10:
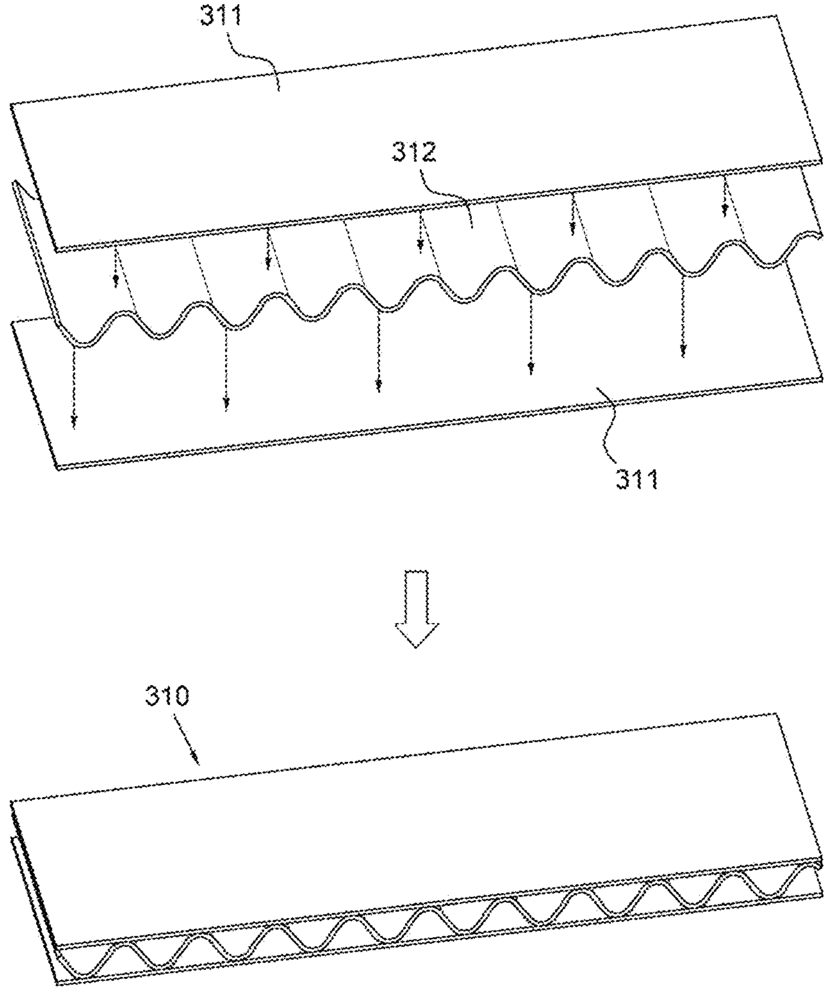
FIG. 10 illustrates a coupler according to the third embodiment of the present invention.

According to the third embodiment of the present invention, the fireproof filler 3 is formed by coupling a plate-shaped first support 311 to a second support 312 having a corrugated cross section (see FIG. 10) to form a strip-shaped assembly 310 and then winding the assembly 310 in a cylindrical shape and is coupled to the inner circumferential surface of the external frame 10.

According to the third embodiment of the present invention, the assembly 310 may be used in manufacturing of each fireproof filler by being cut after formed sufficiently long and thus is advantageous for mass production.

Figure 11:
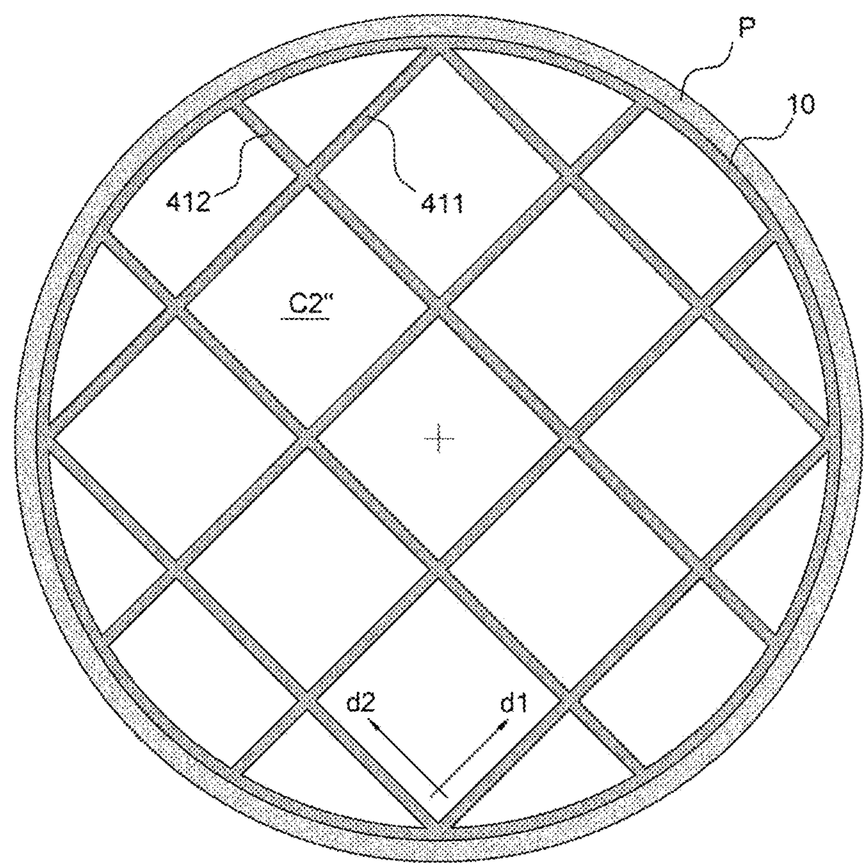
FIG. 11 is a cross-sectional view illustrating a structure of a pipe in which a fireproof filler according to a fourth embodiment of the present invention is installed.
Figure 12:
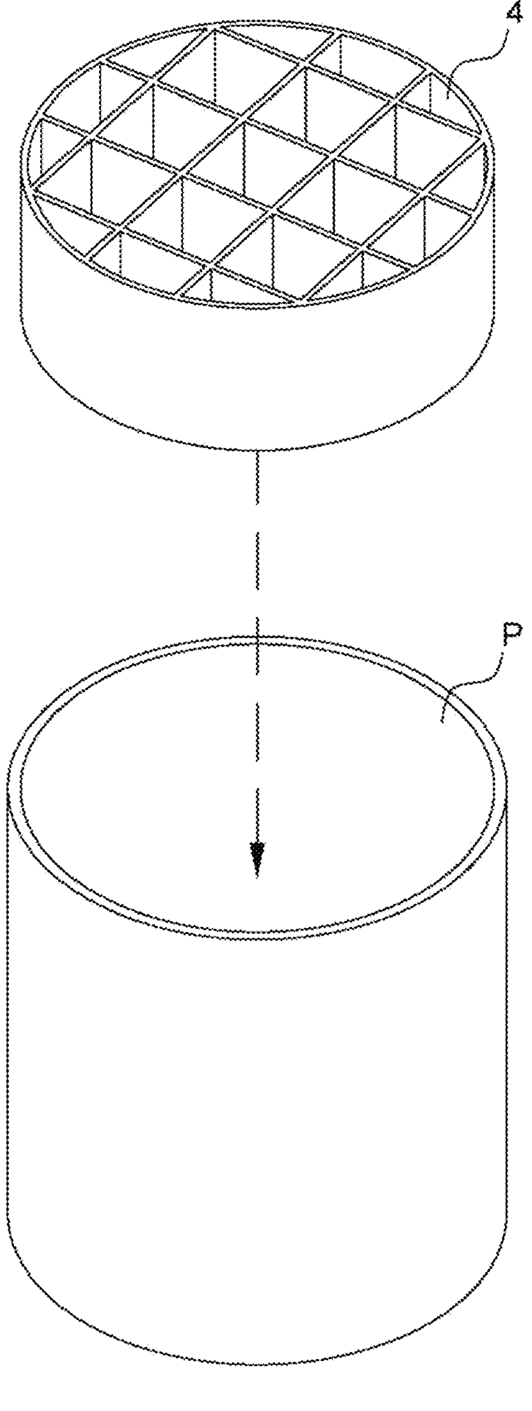
FIG. 12 is a perspective view illustrating the fireproof filler according to the fourth embodiment of the present invention.

FIG. 11 is a cross-sectional view illustrating a structure of a pipe in which a fireproof filler 4 according to a fourth embodiment of the present invention is installed, and FIG. 12 is a perspective view illustrating the fireproof filler 4 according to the fourth embodiment of the present invention.

According to the fourth embodiment of the present invention, the fireproof filler 4 may include a plurality of plate-shaped first support 411 parallel to a first direction perpendicular to the inner circumferential surface of the pipe, and a plurality of plate-shaped second support 412 parallel to a second direction perpendicular to the first direction and may be provided to form a plurality of second compartments C2" by crossing the first supports 411 and the second supports 412.

The fireproof filler 4 according to the fourth embodiment of the present invention can reduce a manufacturing cost due to a simplified manufacturing process.

Figure 13:
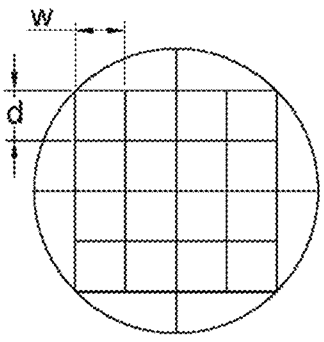
FIG. 13 is a cross-sectional view illustrating various embodiments according to the fourth embodiment of the present invention.
Figure 13:
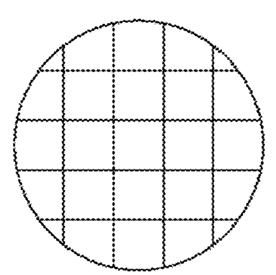
Figure 13:
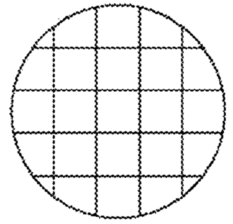
Figure 13:
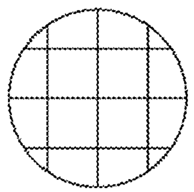
Figure 13:
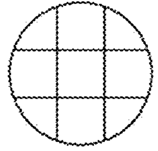
Figure 13:
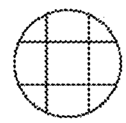
Figure 13:
Figure 14:
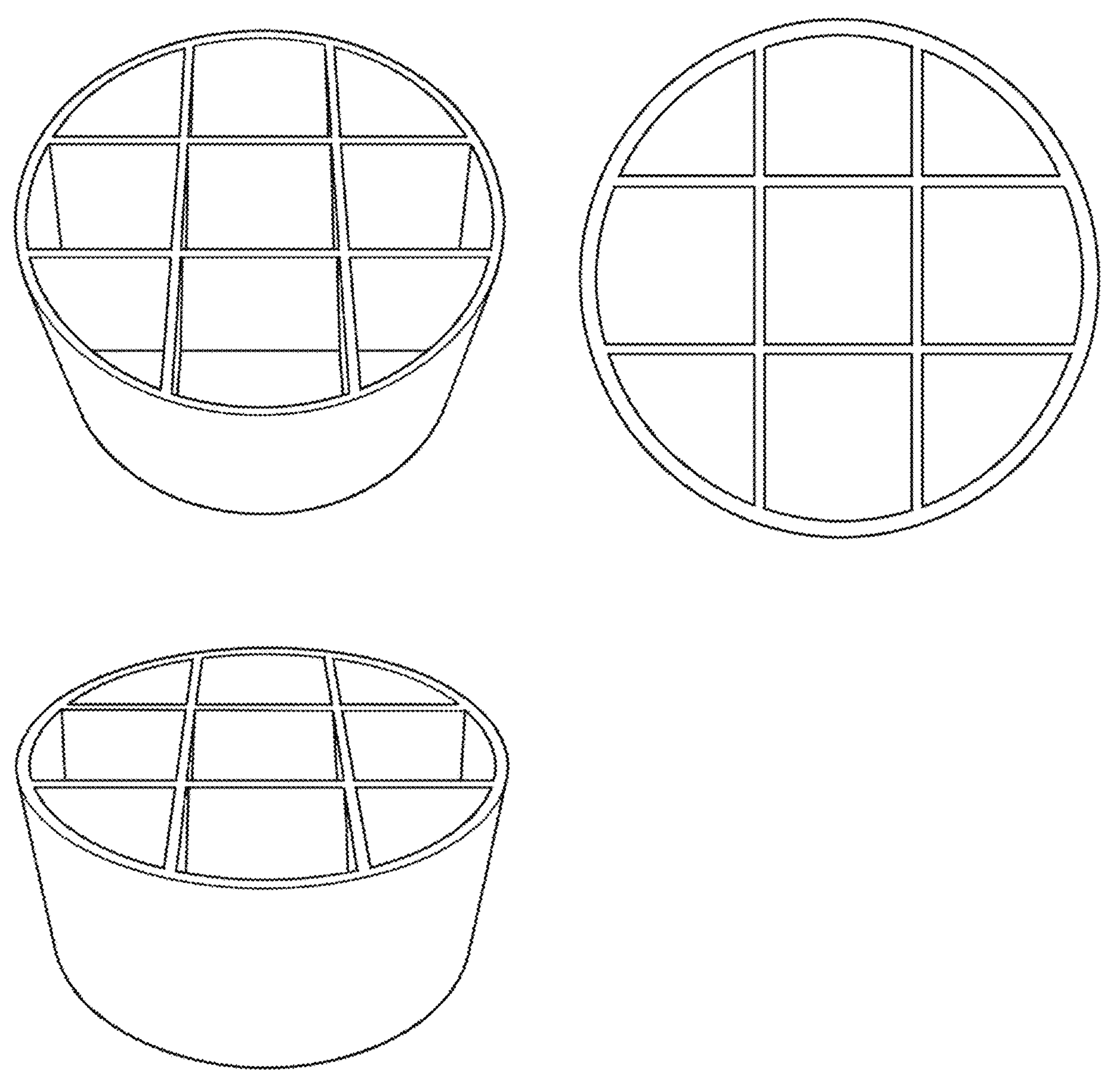
FIG. 14 is a photograph capturing an actual product of the fireproof filler according to the fourth embodiment of the present invention.

FIG. 13 is a cross-sectional view illustrating various embodiments according to the fourth embodiment of the present invention. As illustrated in FIG. 13, the support can be designed by adjusting the number of divided compartments according to the inner diameter of the pipe. Specifically, normally, sizes w and d of the compartment are optimally designed to sizes for quickly blocking the pipe in consideration of an expansion rate of the expandable graphite without disturbing the flow of the fluid as much as possible.

Meanwhile, as an exemplary embodiment, the coating layer formed on the surface of the fireproof filler may include a first coating layer formed of an expandable graphite material with which the surface of the fireproof filler is coated and a second coating layer formed on a surface of the first coating layer.

The second coating layer may be made of a material including at least one of active carbon, ethylene vinyl acetate (EVA), and calcined vermiculite that passes through the pipe. Therefore, it is possible to add a deodorizing effect by active carbon or a moisture absorption effect by calcined vermiculite or improve durability by EVA, and since an area in which the second coating layer comes into contact with the fluid is increased by the fireproof filler, it is possible to increase the deodorizing effect and the moisture absorption effect.

Furthermore, a third coating layer may be further formed on a surface of the second coating layer. The second coating layer and the third coating layer may each be made of any one selected from active carbon, vinyl ethylene acetate, and calcined vermiculite.

Preferably, the second coating layer and the third coating layer are made of any one of active carbon, EVA, and calcined vermiculite, but it is preferable that the second coating layer and the third coating layer are made of different materials. For example, the second coating layer may be made of any one selected from active carbon and EVA, and the third coating layer may be made of a calcined vermiculite material. Alternatively, the second coating layer may be made of calcined vermiculite, and the third coating layer may be made of any one of active carbon and EVA.

Meanwhile, as another embodiment, the coating layer may include the first coating layer and the second coating layer, and the first coating layer or the second coating layer may be made of a mixture including at least one of expanded graphite, active carbon, ethylene acetate, and calcined vermiculite. For example, the first coating layer may be made of a mixture of expandable graphite and calcined vermiculite, and the second coating layer may be made of any one selected from active carbon and EVA. Alternatively, the first coating layer may be made of expandable graphite, and the second coating layer may be made of a mixture of active carbon and calcined vermiculite or a mixture of EVA and calcined vermiculite.

Furthermore, the first coating layer may be formed as a single coating layer made of a mixture of expandable graphite, active carbon, and calcined vermiculite.

The above-described exemplary embodiments of the present invention have been disclosed for illustrative purposes, and those skilled in the art will be able to make various modifications, changes, and addition with respect to the present invention without departing from the spirit and scope of the present invention, and these modifications, changes, and additions should be regarded as falling within the scope of the claims.

Since those skilled in the art to which the present invention pertains can make various substitutions, modifications, and changes without departing from the technical spirit of the present invention, the present invention is not limited by the above-described embodiments and the accompanying drawings.

INDUSTRIAL APPLICABILITY

According to the present invention, it is possible to quickly prevent the spread of a fire compared to the related art.

The invention claimed is:

1. A fireproof filler configured to be installed inside a pipe and to fill a space inside the pipe in case of fire to block flame or heat, the fireproof filler comprising:

an external frame configured to be installed inside the pipe; and at least one support formed inside the external frame and configured to divide a space inside the external frame, wherein a coating layer is formed on surfaces of the external frame and the at least one support, wherein the coating layer includes:

a first coating layer formed of an expandable graphite material with which a surface of the external frame and a surface of the at least one support are coated; and a second coating layer formed on a surface of the first coating layer and made of a material including at least one of active carbon, ethylene vinyl acetate (EVA), and calcined vermiculite.

2. The fireproof filler of claim 1, wherein the at least one support includes:

a plurality of first supports provided in a form of partition walls disposed at predetermined intervals toward a central axis from an inner circumferential surface of the external frame; and a second support provided in a form of a partition wall disposed vertically along the inner circumferential surface of the external frame and configured to fix the plurality of first supports to the external frame.

3. The fireproof filler of claim 1, wherein the at least one support includes:

a first support provided in a plate shape parallel to a first direction perpendicular to an inner circumferential surface of the pipe; and a second support provided in a plate shape parallel to a second direction perpendicular to the first direction, and the first support and the second support are formed to cross each other inside the external frame.

4. The fireproof filler of claim 1, wherein the coating layer further includes:

a third coating layer formed on a surface of the second coating layer, and the second coating layer and the third coating layer are made of any one selected from active carbon, EVA, and calcined vermiculite.

5. The fireproof filler of claim 4, wherein the second coating layer is made of any one selected from active carbon and EVA, and the third coating layer is made of a calcined vermiculite material.

6. The fireproof filler of claim 4, wherein the second coating layer is made of a calcined vermiculite material, and the third coating layer is made of any one selected from active carbon and EVA.

7. The fireproof filler of claim 1, wherein the first coating layer is made of a mixture of expandable graphite and calcined vermiculite, and the second coating layer is made of any one selected from active carbon and EVA.

8. The fireproof filler of claim 1, wherein the second coating layer is made of a mixture of active carbon and calcined vermiculite or a mixture of EVA and calcined vermiculite.

* * * * *